Feb. 26, 1957  F. O. LUENBERGER  2,783,402
FEEDBACK TEST STAND
Filed Sept. 28, 1953  2 Sheets-Sheet 1
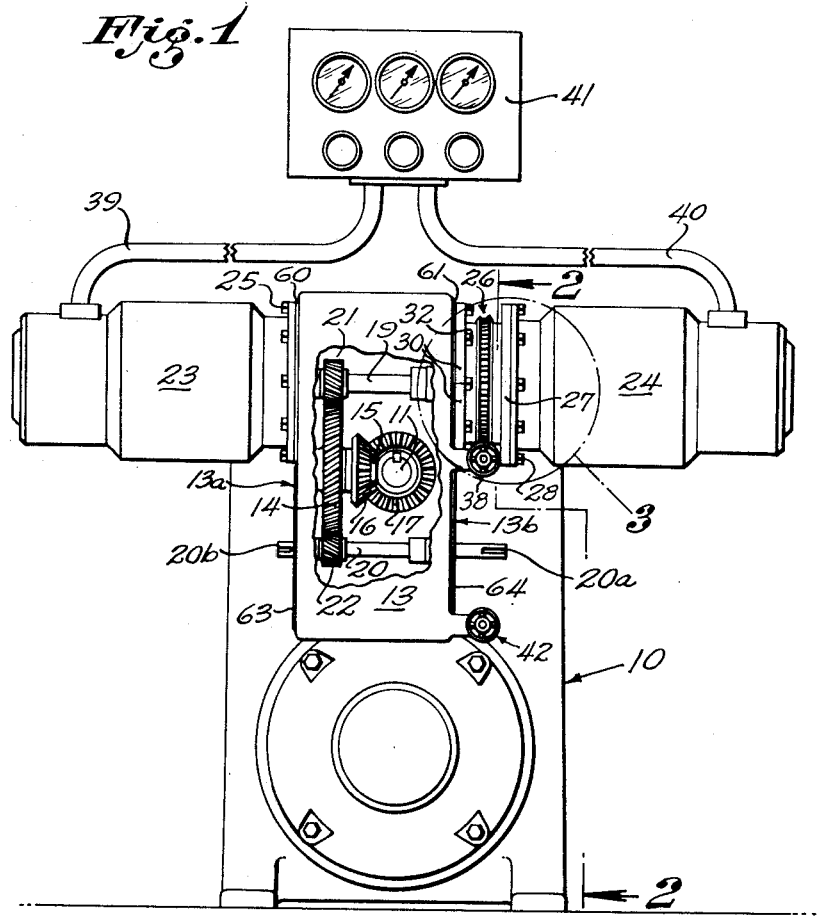
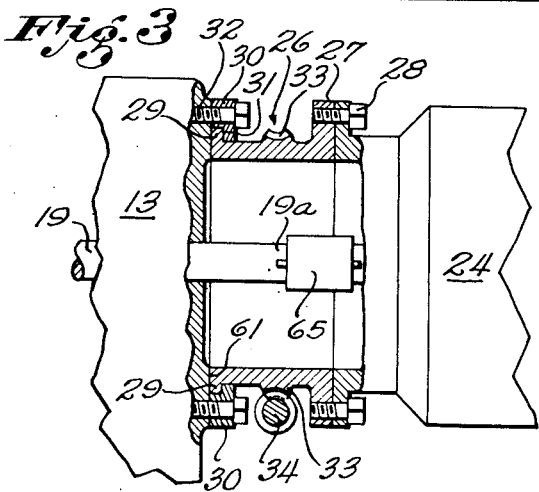
INVENTOR,
FREDERICK O. LUENBERGER
By Flam and Flam
ATTORNEYS.

Feb. 26, 1957
F. O. LUENBERGER
2,783,402
FEEDBACK TEST STAND
Filed Sept. 28, 1953
2 Sheets-Sheet 2
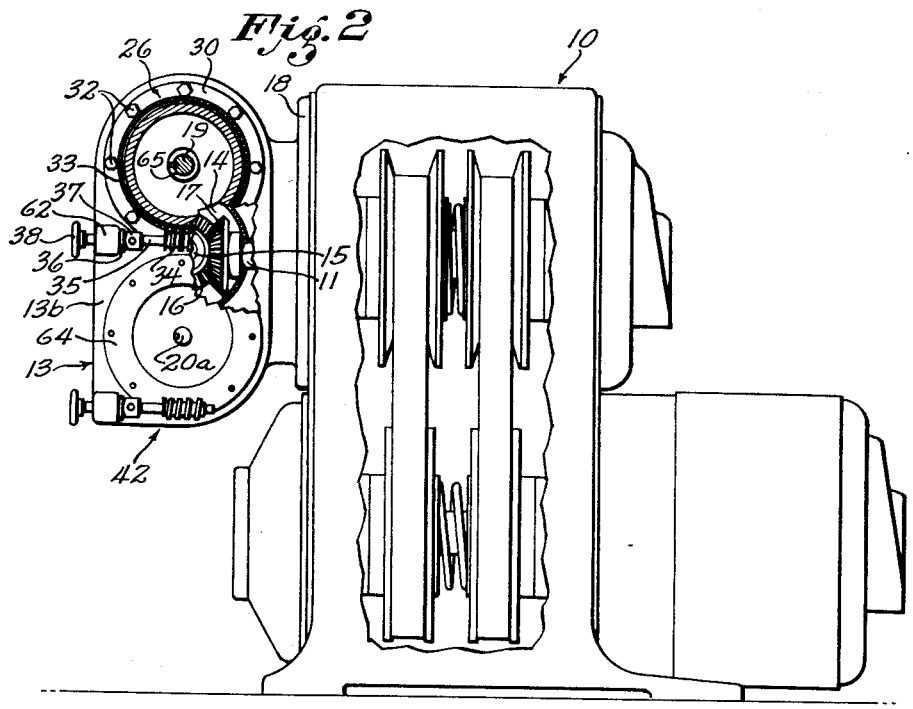
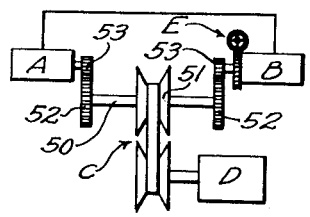
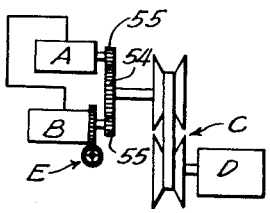
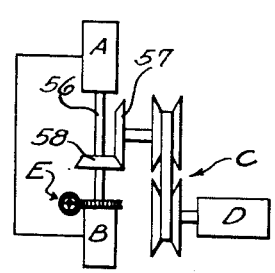
INVENTOR,
FREDERICK O. LUENBERGER
By Flam and Flam
ATTORNEYS.

United States Patent Office 2,783,402
Patented Feb. 26, 1957

2,783,402

FEEDBACK TEST STAND

Frederick O. Luenberger, Los Angeles, Calif., assignor to U. S. Electrical Motors, Inc., Los Angeles, Calif., a corporation of California Application September 28, 1953, Serial No. 382,733

2 Claims. (Cl. 310—112)

This invention relates to apparatus for testing alternators, or other dynamo-electric machines, and particularly to a structure for supporting and supplying power to such machines during testing operations.

In testing dynamo-electric machines of this character having high efficiencies, accurate and simple testing can be accomplished by the aid of feedback. This involves the use of a motor-generator set, one of the elements of which is the machine under test, and the other of which is of identical construction. The electrical input for the motor is supplied by the output of the generator; and the mechanical input for the generator is supplied by the motor. The losses for the system are made up by an auxiliary source of power.

It is an object of this invention to provide a supporting structure for readily performing such tests, and which includes a variable speed drive for supplying requisite motive power for testing.

It is another object of this invention to provide a test stand in which a conventional type variable speed transmission may be used in connection with high speed machines. For this purpose, auxiliary transmission structures are conveniently provided.

It is another object of this invention to provide a device of this character in which, without adjusting such transmission structures, two ranges of speed may be provided for operation from the variable speed transmission. For this purpose, the auxiliary transmission structure is provided with two driven shafts, one rotated at a substantially different speed as compared with the other. To make use of either driven shaft, the machines under test are attached at a selected place upon the structure.

It is another object of this invention to provide an improved detachable mounting for a dynamo-electric machine in which the angular position of the stator structure about the axis of rotation of the rotor can be adjusted. Such adjustment is for the purpose of varying the electrical phase relationships between the interconnected machines to adjust the load characteristics thereof.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is an elevation of the apparatus incorporating the present invention, some of the parts being broken away;

Fig. 2 is a side elevation of the apparatus shown in Fig. 1, a portion of the apparatus being broken away, the view being partly in section along the plane indicated by line 2—2 of Fig. 1;

Fig. 3 is a fragmentary sectional view, taken from that part of Fig. 1 generally designated by the area 3; and Figs. 4, 5 and 6 are diagrammatic views, each showing other arrangements of parts.

The apparatus shown in the drawings is intended to facilitate the testing of high speed alternators, such as may be used for aircraft installations. A customary speed for such machines may be 6,000 or 12,000 revolutions per minute.

The testing method contemplated is one in which two similar machines are operated as a motor-generator set, the electrical output of the generator energizing the motor, and the motor serving as a major source of rotary motion for the generator. A supplementary source of motion supplies the losses for the system. By the aid of such feedback system, the characteristics of the machines can be accurately determined, especially where the efficiency is high.

A variable speed transmission mechanism 10 serves as the supplemental source of rotary motion. The mechanism 10 is of the type having cone pulley elements which, by relative axial adjustment, provide adjustable effective pulley diameters. Such variable ratio transmissions are now well-known. Accordingly, the speed of the output shaft 11 (Fig. 1) may be varied through a continuous range. Usually the speed range of the output shaft of such mechanisms does not substantially exceed 2,000 revolutions per minute.

In order to make it possible for such transmission mechanism 10 to accomplish the testing of high speed apparatus, a step-up transmission mechanism 12 is provided. Rotatably supported within a casing 13 of the step-up transmission mechanism is a helical spur gear 14 operated by the output shaft 11 of the variable speed transmission mechanism 10. The spur gear 14 is carried on a shaft 15 in the casing 13.

A bevel gear member 16, coupled to the shaft 15, is in engagement with a bevel gear 17 attached to the output shaft 11 of the variable speed drive 10. Appropriate alignment of the bevel gear structures 16, 17 is ensured by accurately securing the casing 13 to the casing of the variable speed drive 10. A flange 18 of the housing 13 provides the means whereby the housing structure 13 is so secured.

The spur gear 14 is located between a pair of vertically spaced parallel horizontal countershafts 19 and 20 that extend generally at right angles to the output shaft 11 of the variable speed drive. Suitable bearing structures (not shown) are provided for rotatably supporting the shafts 19 and 20 within the step-up transmission mechanism housing 13. The ends of the shafts 19 and 20 project beyond opposite side walls 13a and 13b of the housing 13.

The upper countershaft 19 is in driving relationship with the spur gear 14 and the variable speed transmission 10 by the aid of a pinion 21 secured to the shaft 19. The ratio of the pitch diameters of the gears 21 and 14 is such that the upper countershaft 19 is operated at a desired high speed, such as, for example, 6,000 revolutions per minute, upon operation of the driven shaft 11 of the variable speed transmission mechanism at the rate of 2,000 revolutions per minute.

A pinion 22 is carried by the lower countershaft 20 and engages the spur gear 14 on the opposite side of the pinion 21. The lower countershaft 20 operates at twice the speed of the other shaft 19 and may attain a speed of 12,000 revolutions per minute.

A pair of alternators may be mechanically coupled by aid of attachments respectively at opposite ends of either countershaft 19 or 20. In the present instance, alternators 23 and 24, designed for operation at 6,000 revolutions per minute, are shown in cooperation with opposite ends of the upper countershaft 19.

The alternators 23 and 24 are secured to the opposite side walls 13a and 13b of the housing 13. The housing structure 13 has annular lands 60 and 61 (Figs. 1 and 3) adapted to support the alternators 23 and 24. Thus, a series of bolts 25 passes through the end flange of the left-hand alternator 23, the bolts being received in appropriately angularly spaced threaded recesses extending into the annular land 60.

The stator of the left-hand alternator 23 is definitely oriented, and the shaft of the alternator 23 is coaxial with the upper countershaft 19. A suitable axially separable coupling is provided for rotatably connecting the left-hand end of the upper countershaft 19 to the shaft of the left-hand alternator 23.

The other alternator 24 is mounted for cooperation with the right-hand end 19a of the upper countershaft 19 in such manner that the angular position of its stator may be adjusted. By virtue of such adjustment, the electrical phase relationship between the machines 23 and 24 may be varied to control the load characteristics for test purposes.

For so mounting the right-hand alternator 24, an adaptor structure 26 is provided. This adapter is generally tubular and has annular flanges 27 and 29 at opposite ends thereof. The end flange of the alternator 24 is immovably secured to one end flange 27 by the aid of a series of bolts 28 engaging these flanges. The other end flange 29 of the adaptor 26 is frictionally held in abutting relationship with the annular land 61 extending about the countershaft end 19a.

For this purpose, a split ring 30 is provided. This split ring 30 has a laterally inwardly extending flange 31 that cooperates with the land functionally to confine the flange 29 of the adaptor 26. A series of bolts 32 secures the split ring 30 to the housing 13. The adaptor 26 and the stator of the alternator 24 carried thereby may be angularly moved, the adaptor being held against rotation upon sufficient tightening of bolts 32, after a desired phase adjustment is effected.

For appropriately angularly positioning the adaptor 26 and the stator of the alternator 24, the adaptor 26 has integrally formed thereon, between its end flanges 27 and 29, a series of teeth 33 forming a worm wheel. A worm 34, formed on an end of a shaft 35, engages the worm wheel to angularly position the structure.

The shaft 35 for the worm 34 is journalled in an integrally formed bracket 62 of the housing 13. The shaft 35 and the worm 34 are held in a definite axial position by the aid of a collar 37 cooperating with the bushing 36. A hand wheel 38, carried by the shaft 35, serves as a means for rotating the worm 34 so that the angular position of the adaptor 26 and alternator 24 is adjusted.

An axially separable coupling 65 rotatably connects the shaft of the right-hand alternator to the right-hand end 19a of the upper countershaft 19.

Conduits 39 and 40 provide electrical connections for the alternators 23 and 24. Measuring instruments and power connections for field currents are mounted on a panel 41, diagrammatically shown in Fig. 1, and cooperate with the electrical connections.

The variable speed transmission mechanism 10, acting through the step-up transmission 12, operates the alternators 23 and 24 at any desired speed up to the operating speed of the alternators 23 and 24. The load characteristics of the machines 23 and 24 can be varied by a simple adjustment of the worm 34 and worm wheel.

Should it be desired to test alternators designed for operation at 12,000 revolutions per minute, they may be placed in cooperative relationship with the lower countershaft 20. For this purpose, the end flange of one alternator can be secured to an annular land 63 provided on the housing side 13a and extending about the left-hand end 20b of the lower countershaft 20. An adaptor ring upon which the other alternator is secured may frictionally engage an annular land 64 formed on the housing 13 and extending about the other end 20a of the countershaft 20. A worm structure 42, similar to that heretofore described, is carried by the housing 13 for cooperation with an adaptor should alternators be mounted for cooperation with the lower countershaft 20.

Figs. 4, 5 and 6 illustrate diagrammatically other structural arrangements in which the machines may be tested.

In Fig. 4, a variable speed transmission mechanism C, operated by motor D, has a driven shaft 50 that is accessible at opposite ends. For this purpose, the separable pulley structures 51 are mounted intermediate the ends of this shaft. Similar spur gear structures 52 are carried at the respective ends of the shaft 50. These spur gears 52 drive similar pinions 53, respectively, that are coupled to the shafts of two machines A and B. A single worm mechanism E is so mounted that it may cooperate with an adaptor to vary the angular position of the stator of one machine. Alternator B cooperates with the worm structure and adaptor.

In the form shown in Fig. 5, the variable speed transmission mechanism C, operated by the motor D, operates a single spur gear 54 with which two pinions 55 at diametrically opposite portions thereof cooperate. Alternators A and B are connected to the respective pinions 55; and an adaptor structure, incorporating a worm wheel, is provided in cooperation with generator B.

In the form shown in Fig. 6, a common countershaft 56 is provided for both alternators A and B. A step-up transmission is provided in this instance by the aid of suitably proportioned intermeshing bevel gear structures 57 and 58 carried by the output shaft of the variable speed transmission mechanism C and the countershaft 56. The generator B, as in the previous forms, cooperates with an adaptor and a worm structure E.

The inventor claims:

1. In a test stand: a pair of alternating current dynamo-electric machines having axially aligned rotors, and having wound stators; a common shaft detachably joining the rotors; a transmission mechanism providing a power supply to the shaft; said mechanism including a casing interposed between the machines and extending about the shaft; one of the stators being affixed exteriorly to a wall of the casing; and means for mounting the other stator exteriorly of a wall of the casing, for angular adjustment about the axis of the rotors.

2. In a test stand: a pair of alternating current dynamo-electric machines having axially aligned rotors and having wound stators; a common shaft having provisions at opposite ends for detachable connection to the rotors; a variable ratio transmission mechanism having a casing interposed between the machines and extending about the shaft; means connecting the shaft intermediate its ends to the transmission mechanism for providing a power supply to the rotors through the shaft; one of the stators being affixed exteriorly to a wall of the casing; and means for mounting the other stator exteriorly of an opposite wall of the casing for angular adjustment about the common axis of the rotors.

References Cited in the file of this patent

UNITED STATES PATENTS

| 1,582,007 | Hamilton | Apr. 20, 1926 |
| 1,955,925 | Maloon | Apr. 24, 1934 |
| 2,192,146 | Nightenhelser et al. | Feb. 27, 1940 |

FOREIGN PATENTS

| 126,897 | Sweden | Dec. 13, 1949 |
| 402,858 | Germany | Sept. 22, 1924 |